UNITED STATES PATENT OFFICE 2,610,139

ORGANIC PHOSPHORUS COMPOUNDS

William T. Dye, Jr., Dayton, Ohio, assignor to Monsanto Chemical Company, St. Louis, Mo., a corporation of Delaware No Drawing. Application May 18, 1950,
Serial No. 162,823

10 Claims. (Cl. 167—22)

The present invention relates to new organic phosphorus compounds and deals more particularly with new polyamido polyphosphates and to a method of preparing the same.

An object of the invention is to provide new and useful organic compounds of phosphorus. Another object of the invention is to provide a new class of highly efficient insecticides. Still another object is the provision of an easy method for the preparation of the new organic phosphorus compounds in good yields.

These and other objects which will be hereinafter disclosed are provided by the following invention wherein pentakis(di-N-substituted amido)triphosphates are obtained by reaction of a bis(di-N-substituted amido)halophosphate with a diester of a di-N-substituted amidophosphoric acid substantially according to the scheme:

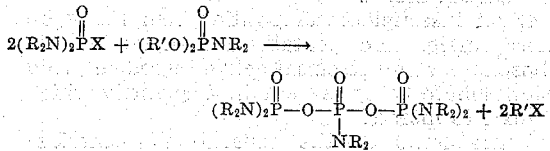

in which R is a hydrocarbon residue of from 1 to 6 carbon atoms and R' is a member of the group consisting of alkyl, cycloalkyl and aralkyl radicals of from 1 to 12 carbon atoms and X is halogen. As illustrative of compounds provided by the present invention and having the general structure shown above may be mentioned pentakis(dimethylamido)triphosphate, pentakis(diethylamido)triphosphate, pentakis(diphenylamido)triphosphate, pentakis(dicyclohexylamido)triphosphate, tetrakis(dimethylamido)diethylamidotriphosphate, pentakis(di-n-butylamido)triphosphate, pentakis(di-n-hexylamido)triphosphate, etc. Examples of bis(di-N-substituted amido)-halophosphates employed for the preparation of the present triphosphates include bis(dimethylamido)chlorophosphate, bis(diisopropylamido)bromophosphate, bis(diethylamido)iodophosphate, bis(diisobutylamido)chlorophosphate, bis(dicyclohexylamido)chlorophosphate, bis(diphenylamido)chlorophosphate, etc. Diesters of di-N-substituted amidophosphoric acids which may be reacted with the halophosphates include dimethyl dicyclohexylamidophosphate, diethyl diphenylamidophosphate, dibutyl dimethylamidophosphate, dioctyl dimethylamidophosphate, didodecyl diethylamidophosphate, dicyclohexyl dimethylamidophosphate, dibenzyl di-n-hexylamidophosphate, etc.

Depending upon the nature of the individual reactants, the condensation of the bis(di-N-substituted amido)halophosphate with the diester of a di-N-substituted amidophosphoric acid to yield the present pentakis(di-N-substituted amido)triphosphate may occur under varying conditions of temperature and pressure. While some of the desired product is formed by simply contacting the bis(di-N-substituted amido)halophosphate with the diester of a di-N-substituted amidophosphoric acid in any proportion, for optimum yields it is advantageous to employ stoichiometric quantities of the reactants, i. e., at least two moles of the halophosphate per mole of the diester, and to maintain the mixture of the two reactants at elevated temperatures, i. e., at temperatures of from, say, 80° C. to 250° C. and preferably 140° C. to 190° C. until the formation of the desired triphosphate is completed. Since the reaction is accompanied by evolution of a hydrocarbon halide, the point at which the condensation is completed is readily determined. In order to minimize formation of by-products and decomposition of the triphosphate, it is advantageous to discontinue heating as soon as evolution of hydrocarbon halide has ceased. Because the condensation occurs very readily, a heating time of only a few minutes to an hour is generally sufficient. When evolution of hydrocarbon halide has ceased, the triphosphate may be separated from the reaction mixture by distillation or by fractional crystallization. If distillation is employed in the separation, it should be effected as rapidly as possible since lengthy heating is detrimental.

The condensation of the bis(di-N-substituted amido)halophosphate with a diester of the di-N-substituted amidophosphoric acid may be effected in the presence or absence of an extraneous solvent or diluent. While the use of a diluent is sometimes advantageous, particularly when working with large quantities of reactants, such a practice generally requires longer heating time, both during the condensation step and in the separation procedure.

When operating in the absence of a solvent or diluent, and employing stoichiometric quantities of the reactants, the crude reaction product may often be employed as such for many purposes.

The present pentakis(di-N-substituted amido)-triphosphates are stable, colorless, high boiling materials which range from viscous liquids to white, crystalline solids. They are advantageously employed as contact and/or systemic pesticides and are particularly valuable as systemic insecticides. Application of small amounts of the present triphosphates to plants which are to be protected from insect pests results in absorption of the triphosphate by the plant, whereby the entire plant system is rendered pest-proof. The present triphosphates may be applied to plants as dusts or sprays. They may be admixed with talc, bentonite or other inert powders or dusts in concentrations of, say, from 0.5 per cent to 5 per cent and dusted on herbage, grasses, trees, etc., or they may be employed in aqueous and organic water emulsions and solutions in like concentrations and sprayed on the organisms which are to be protected.

The invention is further illustrated, but not limited, by the following examples:

*Example 1*

A mixture consisting of 34.1 g. (0.2 mole) of bis(dimethylamido)chlorophosphate and 18.1 g. (0.1 mole) of diethyl dimethylamidophosphate was heated under reflux to a temperature of 180° C. within a time of 10 minutes. During this period it was noted that gas evolution (ethyl chloride) began at a temperature of 120° C. and became very vigorous at about 170° C., but by the time the temperature reached 180° C. evolution of the ethyl chloride was very much slower. The temperature was then brought to 200° C. and allowed to remain at this point for about 3 minutes. The total heating time was 15 minutes. The reaction mixture was allowed to cool and then fractionated to give 26 g. of the substantially pure pentakis(dimethylamido)triphosphate, B. P. 190 to 200° C./0.5 mm. of mercury, and analyzing 17.59 per cent nitrogen (calculated for nitrogen, 17.81 per cent).

*Example 2*

0.3 mole (51.2 g.) of bis(dimethylamido)-chlorophosphate and 0.1 mole (18.1 g.) of diethyl dimethylamidophosphate were mixed in a 100 cc. flask and heated with a mantle to a temperature of 160° C., at which point vigorous evolution of ethyl chloride began. External heating was then discontinued, but the temperature of the reaction mixture rose to 195° C. within 2 minutes and remained at this point for an additional 5 minutes. Evolution of ethyl chloride became slower, the temperature fell to 185° C., and the mantle was removed. The reaction mixture was then rapidly cooled, transferred to a distilling flask fitted with an 8 inch Vigreux column, and distilled to give 21 g. (53 per cent yield) of substantially pure pentakis(dimethylamido)triphosphate, B. P. 180 to 190° C./0.4 mm. of mercury, $n^{25}_D=1.4660$.

*Example 3*

This example shows the use of a diluent and longer reaction time in the preparation of pentakis(dimethylamido)triphosphate. A mixture consisting of 36.2 g. (0.2 mole) of diethyl dimethylamidophosphate, 76.6 g. (0.45 mole) of bis(dimethylamido)chlorophosphate and 150 cc. of xylene was refluxed for a time of 18 hours. Separation of some solids which formed upon cooling, and distillation of the filtrate gave 22 g. of crude pentakis(dimethylamido)triphosphate, B. P. 170 to 190° C./0.4 mm. of mercury.

Preparation of other pentakis(di-N-substituted amido)triphosphates in which the substituent is a hydrocarbon radical of from 1 to 6 carbon atoms may be similarly effected, the bis(dimethylamido)chlorophosphate of the above examples being replaced by other bis(N-substituted amido)chlorophosphates and the diethyl dimethylamidophosphate by other diesters of di-N-substituted amidophosphoric acids.

When it is desired to employ a solvent in the reaction, inert liquids which may be employed instead of xylene include petroleum ether, benzene, toluene, etc.

In some instances, in order to decrease heating time and temperature, it may be advisable to operate at above or below atmospheric pressures. Rapid removal of the hydrocarbon halide as it is evolved, e. g. by evacuation or by sweeping out with an inert gas, may also accelerate the reaction and permit the use of lower temperatures.

What I claim is:

1. As new compounds, pentakis(di-N-substituted amido)triphosphates having the general formula $$(R_2N)_2\overset{O}{\overset{\|}{P}}-O-\underset{NR_2}{\underset{|}{\overset{O}{\overset{\|}{P}}}}-O-\overset{O}{\overset{\|}{P}}-(NR_2)_2$$

in which R is a hydrocarbon residue of from 1 to 6 carbon atoms.

2. As a new compound, pentakis(dimethylamido)triphosphate.

3. An insecticidal composition comprising an inert carrier and as the essential active ingredient in a quantity which is toxic to insects a pentakis(di-N-substituted amido)triphosphate having the general formula $$(R_2N)_2\overset{O}{\overset{\|}{P}}-O-\underset{NR_2}{\underset{|}{\overset{O}{\overset{\|}{P}}}}-O-\overset{O}{\overset{\|}{P}}-(NR_2)_2$$

in which R is a hydrocarbon residue of from 1 to 6 carbon atoms.

4. An insecticidal composition comprising an inert carrier and pentakis(dimethylamido)triphosphate, as an essential active ingredient, said triphosphate being present in a quantity which is toxic to insects.

5. The method for the preparation of pentakis-(di-N-substituted amido)triphosphates having the general formula $$(R_2N)_2\overset{O}{\overset{\|}{P}}-O-\underset{NR_2}{\underset{|}{\overset{O}{\overset{\|}{P}}}}-O-\overset{O}{\overset{\|}{P}}-(NR_2)_2$$

in which R is a hydrocarbon residue of from 1 to 6 carbon atoms which comprises heating a halophosphate having the general formula $$(R_2N)_2POX$$

in which R is a hydrocarbon residue of from 1 to 6 carbon atoms and X is halogen, with a diester of an amidophosphoric acid having the general formula $$(R'O)_2PONR_2$$

in which R is a hydrocarbon residue of from 1 to 6 carbon atoms and R' is a member of the group consisting of alkyl, cycloalkyl and aralkyl radicals of from 1 to 12 carbon atoms.

6. The method for the preparation of pentakis-(dimethylamido)triphosphate which comprises heating bis(dimethylamido)chlorophosphate with a diester of dimethylamidophosphoric acid having the general formula $$(RO)_2PON(CH_3)_2$$

in which R is a member of the group consisting of alkyl, cycloalkyl and aralkyl radicals of from 1 to 12 carbon atoms.

7. The method for the preparation of pentakis-(dimethylamido) triphosphate which comprises heating bis(dimethylamido) chlorophosphate with diethyl dimethylamidophosphate.

8. The method which comprises heating at least two molar equivalents of a bis(di-N-substituted amido)halophosphate having the general formula $$(R_2N)_2POX$$

in which R is a hydrocarbon residue of from 1 to 6 carbon atoms and X is halogen with a molar equivalent of a diester of a di-N-substituted amidophosphoric acid having the general formula $$(R'O)_2PONR_2$$

in which R is a hydrocarbon residue of from 1 to 6 carbon atoms and R' is a member of the group consisting of alkyl, cycloalkyl and aralkyl radicals of from 1 to 12 carbon atoms and recovering from the resulting reaction product a pentakis(di-N-substituted amido)triphosphate having the general formula $$(R_2N)_2\overset{O}{\underset{}{P}}-O-\overset{O}{\underset{NR_2}{P}}-O-\overset{O}{\underset{}{P}}-(NR_2)_2$$

in which R is a hydrocarbon residue of from 1 to 6 carbon atoms.

9. The method which comprises heating at least two molar equivalents of bis(dimethylamido)chlorophosphate with a molar equivalent of a diester of dimethylamidophosphoric acid having the general formula $$(RO)_2PON(CH_3)_2$$

in which R is a member of the group consisting of alkyl, cycloalkyl and aralkyl radicals of from 1 to 12 carbon atoms and recovering pentakis-(dimethylamido)triphosphate from the reaction product.

10. The method which comprises heating at least two molar equivalents of bis(dimethylamido)chlorophosphate with a molar equivalent of diethyl dimethylamidophosphate and recovering pentakis(dimethylamido)triphosphate from the reaction product.

WILLIAM T. DYE, Jr.

REFERENCES CITED

The following references are of record in the file of this patent:

UNITED STATES PATENTS

| Number | Name | Date |
|---|---|---|
| 2,502,966 | Kosolapoff | Apr. 4, 1950 |